(12) United States Patent
Drahm et al.

(10) Patent No.: US 6,807,866 B2
(45) Date of Patent: Oct. 26, 2004

(54) TRANSDUCER OF THE VIBRATION TYPE, SUCH AS AN ELECTROMECHANICAL TRANSDUCER OF THE CORIOLLIS TYPE

(75) Inventors: Wolfgang Drahm, Freising (DE); Alfred Rieder, Landshut (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 10/079,828

(22) Filed: Feb. 22, 2002

(65) Prior Publication Data

US 2002/0144557 A1 Oct. 10, 2002

Related U.S. Application Data

(60) Provisional application No. 60/270,124, filed on Feb. 22, 2001.

(51) Int. Cl.[7] .................................................. G01F 1/84
(52) U.S. Cl. .................................................. 73/761.355
(58) Field of Search ...................... 73/861.355, 861.354, 73/861.351, 861.357

(56) References Cited

U.S. PATENT DOCUMENTS

| | | |
|---|---|---|
| RE31,450 E | 11/1983 | Smith |
| 4,491,025 A | 1/1985 | Smith et al. |
| 4,768,385 A | 9/1988 | Cage |
| 5,060,523 A | 10/1991 | Lew |
| 5,131,280 A | 7/1992 | Lew |
| 5,275,061 A | 1/1994 | Young et al. |
| 5,349,872 A | 9/1994 | Kalotay et al. |
| 5,359,881 A | 11/1994 | Kalotay et al. |
| 6,360,175 B1 * | 3/2002 | Cunningham et al. ........ 702/39 |

FOREIGN PATENT DOCUMENTS

DE    4327052 A1    2/1995

\* cited by examiner

Primary Examiner—Harshad Patel
(74) Attorney, Agent, or Firm—Bacon & Thomas

(57) ABSTRACT

An electromechanical transducer of the Coriolis type which provides an output in response to the mass flow rate of a fluid flowing in a pipe. The transducer has a flow tube, curved symmetrically with respect to an axis of symmetry lying in a tube plane, for conducting the fluid. It also has a rigid support body for mounting the flow tube, with the flow tube being fixed to the rigid support body at both an inlet end and an outlet end. It further has an excitation system which in operation excites the flow tube into vibrations in a first eigenmode which is symmetrical in the tube plane.

39 Claims, 2 Drawing Sheets

TRANSDUCER OF THE VIBRATION TYPE, SUCH AS AN ELECTROMECHANICAL TRANSDUCER OF THE CORIOLLIS TYPE

CROSS REFERENCE TO RELATED APPLICATION

This application is based on Provisional Application filed Feb. 22, 2001 as application 60/270,124.

TECHNICAL FIELD

This invention relates to a transducer of the vibration type, such as an electromechanical transducer of the Coriolis type which is particularly suited for use in a Coriolis mass flowmeter.

BACKGROUND OF THE INVENTION

To determine the mass flow rate of a medium flowing in a pipe, particularly of a fluid, use is frequently made of measuring devices which produce Coriolis forces in the fluid by means of an electromechanical transducer of the Coriolis type driven by control and evaluation electronics connected thereto, and which derive from the Coriolis forces a measurement signal representative of mass flow rate.

Coriolis mass flowmeters or Coriolis mass flow/density meters have been known and in industrial use for a long time. US-RE 31,450, for example, discloses a Coriolis mass flow meter with an electromechanical transducer of the Coriolis type which provides an output in response to the mass flow rate of a fluid flowing in a pipe and which comprises:

- a single flow tube, curved in a tube plane symmetrically with respect to an axis of symmetry lying in said plane, for conducting the fluid;
- a rigid support body for mounting the flow tube,
  - the flow tube being fixed to the support body by an inlet-side mounting and an outlet-side mounting; and
- an excitation system which in operation excites the flow tube into cantilever beam vibrations of a first eigenmode, at which the flow tube is subjected to torsion out of the tube plane about a tube axis which joins the two mountings and is perpendicular to the axis of symmetry.

As is well known, such flow tubes bent in one plane, e.g., U-shaped tubes, if excited into cantilever beam vibrations, cause Coriolis forces in the fluid passing therethrough. These, in turn, result in torsional vibrations about the axis of symmetry according to a second eigenmode of the flow tube being superimposed on the beam vibrations, so that vibrations at the inlet and outlet ends exhibit a measurable phase difference, which is also dependent on mass flow rate.

To determine such a phase difference, the prior-art mass flowmeter further comprises an electrodynamic sensor arrangement which serves to punctually sense vibrations of the flow tube at the inlet and outlet ends and to generate electric sensor signals influenced by the mass flow rate of the fluid.

In operation, the flow tubes of such meters are usually excited at an instantaneous resonance frequency of the first natural mode, particularly with the vibration amplitude maintained constant. Since this resonance frequency is also dependent on the instantaneous density of the fluid, commercially available Coriolis mass flowmeters can also be used to measure the density of the fluid.

Because of the curved tube shape, the flow tubes of such Coriolis mass flowmeters can be made relatively long, so that high sensitivity of the transducer to the mass flow rate to be measured can be achieved with a relatively short mounting length and with relatively low excitation energy. This also permits the flow tube to be made from materials with a high modulus of elasticity, particularly from high-quality steel. In such meters with a straight flow tube, for example, the latter must generally be made of a material having a lower modulus of elasticity than high-quality steel in order to achieve sufficient sensitivity. Therefore, flow tubes of titanium or zirconium are preferably used for such meters, but because of the higher material cost and the usually higher machining cost, such tubes are much more expensive than those made from high-quality steel.

Another advantage of a curved flow tube is that thermally induced expansion, particularly in flow tubes with a high expansion coefficient, produce virtually no or only very slight mechanical stresses in the connected pipe. A known disadvantage of such a design of the Coriolis mass flowmeter is that in operation, inertial forces act via the flow tube, particularly because of the lateral deflections of the tube, and may cause torsional vibrations and/or flexural vibrations in the connected pipe.

To reduce such unwanted effects, commercially available Coriolis mass flowmeters are frequently offered with two identically bent, parallel flow tubes. U.S. Pat. Nos. 4,491,025, 4,768,385, or 5,359,881, for example, discloses an electromechanical transducer of the Coriolis type which provides an output in response to the mass flow rate of a fluid flowing in a pipe and which comprises:

- two identical flow tubes for conducting the fluid, each of which is curved in an associated tube plane symmetrically with respect to an associated axis of symmetry lying in this plane;
- a rigid support body for mounting the flow tubes,
  - each of the flow tubes being fixed to the support body by an associated inlet-side mounting and an associated outlet-side mounting; and
- an excitation system which in operation excites the flow tubes into cantilever beam vibrations of a first natural mode, in which the flow tubes are subjected to torsion out of their respective planes about a tube axis which joins the associated inlet-side and outlet-side mountings and is perpendicular to the respective axis of symmetry.

In operation, the two flow tubes, which are commonly connected in parallel by means of a manifold at the inlet end and a manifold at the outlet end, vibrate as a pair of tuning fork tines with a phase difference of 180°, i.e., in phase opposition, whereby the laterally acting inertial forces of the two flow tubes cancel each other and are thus neutralized.

A major disadvantage of such double flow tube configurations is the use of the manifolds, which is inherent in the design. On the one hand, the manifolds present increased resistance to the moving fluid and constitute regions of the conduit in which deposits tend to build up. On the other hand, such manifolds, particularly if designed to reduce the aforementioned fluid-mechanical disadvantages, are expensive transducer components which account for a considerable part of the manufacturing costs of such Coriolis mass flowmeters.

The aforementioned disadvantages are largely eliminated in a transducer type as shown in U.S. Pat. No. 5,275,061, for example. This patent specification discloses an electromechanical transducer of the Coriolis type which provides an output in response to the mass flow rate of a fluid flowing in a pipe and which comprises:

- a flow tube, curved in a tube plane symmetrically with respect to an axis of symmetry lying in this plane, for-conducting the fluid;

a rigid support body for mounting the flow tube,
the flow tube being fixed to the support body at an inlet end and an outlet end;
a rigid vibration isolator attached to the flow tube for forming a rigid, curved flow tube segment of a predeterminable three-dimensional shape which is dimensionally stable in operation; and
an excitation system which in operation excites the flow tube into vibrations in a mode symmetrical with respect to the tube plane, in which mode the three-dimensional shape of the flow tube segment is always preserved.

With fluid flow present, Coriolis forces cause the flow tube, excited in the manner described above, to be deformed antisymmetrically in the tube plane. The vibrations of the flow tube are sensed at the inlet and outlet ends, and the resulting phase-shifted sensor signals are suitably processed and evaluated.

It has turned out, however, that although virtually no torsional vibrations are produced by the aforementioned transducer, and the Coriolis-force-generating vibrations of the single flow tube, which are generally also those with the greatest amplitudes, are substantially neutralized in a simple manner by a tube shape that is variable in the tube plane but always remains symmetrical, the deformation movements of the flow tube and the resulting mass acceleration may cause inertial forces in the transducer which act in the direction of the axis of symmetry and, thus, in a direction transverse to the pipe. These inertial forces may cause undesired flexural vibrations of the connected pipe.

Furthermore, a vibration isolator of the kind described, which, as also proposed in U.S. Pat. No. 5,275,061, may also be designed as an enclosure of the flow tube segment, represents a cantilever mass which, when accelerated during oscillating motions of the excited and fluid-carrying flow tube, may also have a disturbing effect on the pipe. In addition, such a vibration isolator is a component that has to be manufactured additionally and incorporated into the transducer using additional process steps, and thus increases the manufacturing costs.

SUMMARY OF THE INVENTION

It is therefore an object of the invention to provide a transducer suitable for use in a Coriolis mass flowmeter which is easy to manufacture, permits the use of materials with a high modulus of elasticity and/or a high coefficient of expansion, particularly of high-quality steel, for the flow tube, and during operation causes virtually no or only very slight undesired vibrations, particularly no torsional vibrations and/or no flexural vibrations, in the connected pipe.

To attain this object, the invention consists in an electromechanical transducer of the Coriolis type which provides an output in response to the mass flow rate of a fluid flowing in a pipe and which comprises:
a flow tube, curved symmetrically with respect to an axis of symmetry lying in a tube plane, for conducting the fluid;
a rigid support body for mounting the flow tube,
the flow tube being fixed to the support body at an inlet end and an outlet end; and
an excitation system which in operation excites the flow tube into vibrations in a first eigenmode which is symmetrical in the tube plane.

In a first preferred embodiment of the invention, the flow tube is curved in the tube plane trapezoidally.

In a second preferred embodiment of the invention, the excitation system generates an excitation force which deforms the flow tube and acts in the direction of the axis of symmetry.

In a third preferred embodiment of the invention, the first eigenmode of the flow tube has at least three antinodes.

In a fourth preferred embodiment of the invention, the flow tube performs vibrations in an f3 natural mode.

A fundamental idea of the invention is to generate Coriolis forces in the flow tube, which is curved as described above, by exciting the latter into vibrations in the tube plane in such a dynamically balanced manner that inertial forces acting in the tube plane in the direction of the axis of symmetry are compensated for and thus substantially eliminated.

The principal advantages of the transducer according to the invention are that it can be made very compact and, because of the dynamic vibration isolation, very light while being easy to manufacture.

A further advantage of the invention is that both additional vibration isolators of the above-described kind and the parallel double flow tube configuration, and thus the costly-to-make manifolds, can be dispensed with.

BRIEF DESCRIPTION OF THE DRAWINGS

The invention and further advantages will become more apparent from the following description of an embodiment of the invention taken in conjunction with the accompanying drawings. Throughout the various figures, like parts are designated by like reference characters. Reference characters that have already been assigned are not repeated in subsequent figures if this contributes to clarity.

In the drawings.

DESCRIPTION OF THE PREFERRED EMBODIMENT

Figure 1:
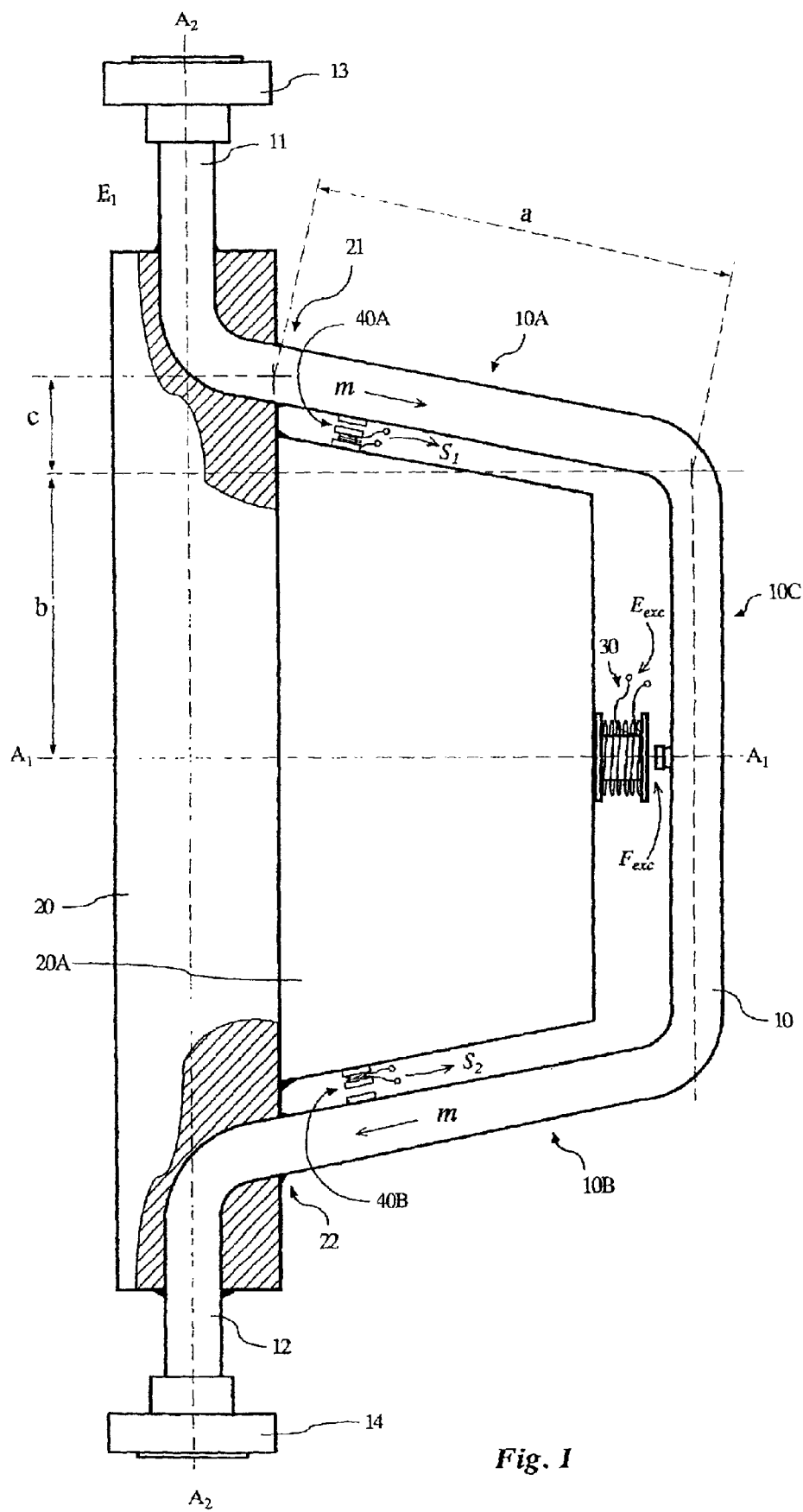
FIG. 1 is a partly sectioned side view of an electromechanical transducer of the Coriolis type with a single flow tube.

In FIG. 1, an electromechanical transducer of the Coriolis type which provides an output in response to the mass flow rate m of a fluid flowing in a pipe (not shown) is shown in a schematic side view. The transducer, particularly if used as a primary element in a Coriolis mass flowmeter, serves to generate Coriolis forces in the moving fluid which act on the transducer and can be measured, particularly using sensor technology.

To that end, the transducer comprises a preferably single curved flow tube 10 for conducting the fluid, which oscillates in operation.

As shown in FIG. 1, flow tube 10 is fixed to a rigid support body 20 of the transducer by an inlet-side first mounting 21 and an outlet-side second mounting 22. The two mountings 21, 22 can be implemented in the manner known to those skilled in the art, for example by welding or brazing.

Support body 20 may, for instance, be a sectional bar, a support frame, or a plate of suitable cross section and material. Support body 20 may be of either one-piece or multipart construction and be made from the materials commonly used for such support bodies, such as structural steel, high-quality steel, or other suitable metal alloys.

As shown in FIG. 1, flow tube 10 is curved symmetrically with respect to a first tube axis $A_1$, which lies in a first tube plane $E_1$ and will hereinafter be referred to as an axis of symmetry $A_1$ for the sake of clearness; tube plane $E_1$ is parallel to the plane of the paper of FIG. 1.

In the embodiment shown, the projection of flow tube 10 to tube plane $E_1$ describes a symmetrical trapezoid with a ratio of the parallel sides greater than one; the greater one of the two parallel sides is parallel to a second tube axis $A_2$, which lies in tube plane $E_1$ and is normal to the axis of symmetry $A_1$. Investigations have also shown that aside from the trapezoidal shape described, a trapezoidal shape with a ratio of the parallel sides less than one is also suitable. Such a curved flow tube is also described in U.S. Pat. No. 5,359,881, for example.

Figure 2:
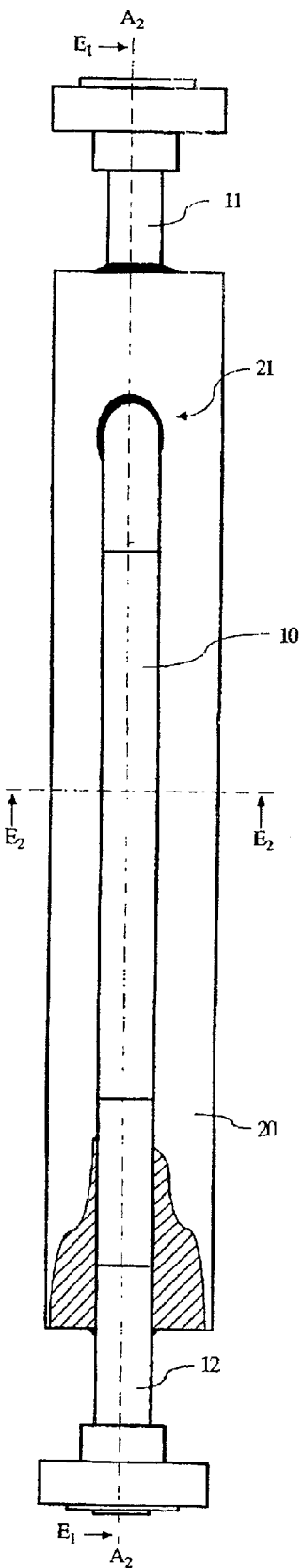
FIG. 2 is a partly sectioned top view of the transducer of FIG. 1.

In a preferred embodiment of the invention, tube plane $E_1$ corresponds to a first plane of symmetry of flow tube 10, which splits the latter lengthwise. Accordingly, as is readily apparent when FIGS. 1 and 2 are viewed together, the axis of symmetry $A_1$ is practically identical with a one-dimensional projection to tube plane $E_1$ of a second plane of symmetry $E_2$ of flow tube 10, which intersects tube plane $E_1$ at right angles.

To conduct the fluid into flow tube 10, the transducer is connected to the pipe via tube segments 11 and 12 ending in flow tube 10 at the inlet end and outlet end, respectively. The two tube segments 11, 12 are preferably aligned with each other and with tube axis $A_2$. As shown schematically in FIG. 1, tube segments 11, 12 may be fixed to support body 20 in the same manner as flow tube 10, for example by welding.

If the transducer is to be detachable from the pipe, each of the two tube segments 11, 12 preferably has a flange 13, 14 formed thereon; if necessary, the two tube segments 11, 12 may also be connected to the pipe directly, for example by welding or brazing.

Advantageously, flow tube 10 and tube segments 11, 12 are of one-piece construction, for which a single tubular, suitably bent semifinished product is used; if necessary, flow tube 10 and tube segments 11, 12 may also be formed from separate semifinished products that are joined together, for example welded together.

In operation, flow tube 10 is excited into mechanical vibrations, particularly at one of its resonance frequencies, such that it is deflected essentially according to first eigenmode and thus deforms unconstrained, preferably completely. According to the invention, the excited eigenmode of flow tube 10 is chosen so that virtually the entire oscillating flow tube is deformed while its above-described symmetry in tube plane $E_1$ is essentially preserved. As this symmetry is preserved in the excited flow tube 10, the inertial forces caused by the vibrations in the first eigenmode and acting in tube plane $E_1$ normal to the axis of symmetry $A_1$ cancel each other, so that their effect toward the outside, particularly on the connected pipe, is practically completely neutralized.

Figure 4:
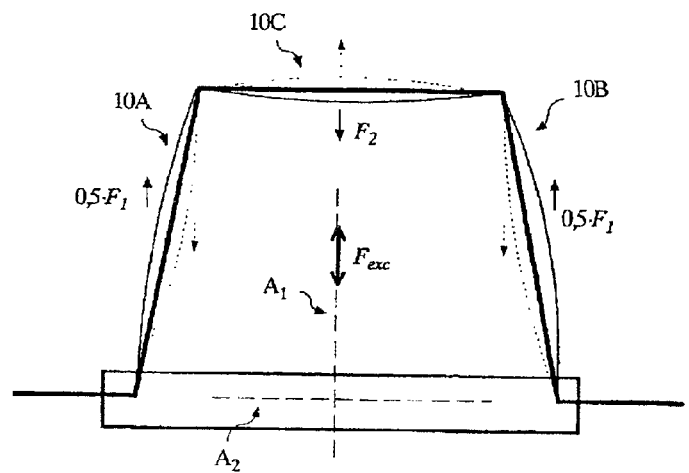
FIG. 4 schematically shows deflection lines of the flow tube of FIG. 1 during operation of the transducer.
Figure 3:
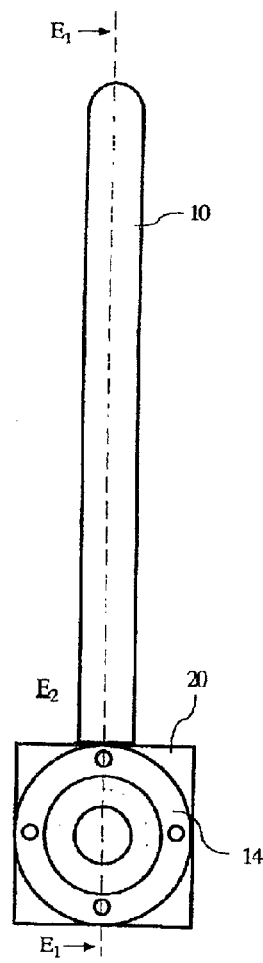
FIG. 3 is a front view of the transducer of FIG. 1.

In another preferred embodiment of the invention, flow tube 10 is excited in operation at a vibration frequency which corresponds as exactly as possible to a resonance frequency of the so-called f3 natural mode of flow tube 10, i.e., to a natural mode in which the oscillating, but empty flow tube 10 temporarily has three antinodes in tube plane $E_1$, as shown schematically in FIG. 4 by deflection lines representing time-displaced snapshots of flow tube 10.

If fluid flows in the pipe, so that the mass flow rate m is nonzero, Coriolis forces will be induced by the excited flow tube 10 in the fluid flowing through the latter. These, in turn, react on flow tube 10, thus causing an additional deformation of flow tube 10 according to a second eigenmode, which also lies in tube plane $E_1$ and is superimposed on the first eigenmode. This deformation can be measured using sensor technology. The instantaneous characteristic of the deformation of flow tube 10, particularly in terms of amplitude, is also dependent on the instantaneous mass flow rate m. The second eigenmode of the flow tube in the transducer according to the invention may, for instance, be the antisymmetric f2 natural mode, i.e. the natural mode with two antinodes, and/or the antisymmetric f4 natural mode, i.e., the natural mode with four antinodes.

If flow tube 10 is excited in the first eigenmode, the fact that no symmetry other than that described by the axis of symmetry $A_1$ exists in tube plane $E_1$ makes it possible to generate inertial forces which, as mentioned above, cause lateral deflections of the transducer in the direction of the axis of symmetry $A_1$ and, thus, vibrations of the pipe, particularly flexural vibrations.

To the inventors' surprise it has turned out, however, that by suitably dimensioning the flow tube 10, these inertial forces acting in the direction of the axis of symmetry $A_1$ can be dynamically compensated for at least in the operating range of the transducer and at least to the extent that no significant disturbances are transmitted to the pipe. In other words, in that case, the above-described, outwardly directed force effects of the transducer are neutralized despite a geometric asymmetry being always present in tube plane $E_1$ with respect to tube axis $A_2$ or to other tube axes extending parallel thereto.

If the f3 natural mode is excited, on the one hand, as shown in FIG. 4, a first inertial force component $F_1$ is generated in the direction of the axis of symmetry $A_1$ as a result of an antisymmetric deformation of two side leg segments of flow tube 10, namely of an inlet-side first side leg segment 10A and an outlet-side second side leg segment 10B. On the other hand, a second inertial force component $F_2$, caused by a deformation of a top segment 10C of flow tube 10, acts in phase opposition to inertial force component $F_1$.

Investigations of different flow tube shapes have shown that, to minimize or completely neutralize the disturbances originating from flow tube 10, a suitable dimensioning rule can be formulated based on a few geometric parameters of flow tube 10, namely on a mean side leg length a, a top leg length 2b, with a+b being equal to half the overall length of flow tube 10, and an orthogonal projection c of the side leg segment length a to tube axis $A_2$, see FIG. 1.

For the trapezoidally curved flow tube 10 with a ratio of the parallel sides greater than one, the dimensioning rule can be expressed as $$\frac{c}{a+b} = 0.002 \cdot \exp\left(17.33 \cdot \frac{b}{a+b}\right) \quad (1)$$

For the trapezoidally curved flow tube 10 with a ratio of the parallel sides less than one, the following formula was determined empirically for the dimensioning rule:

$$\frac{c}{a+b} = -37.5 \cdot \left(\frac{b}{a+b}\right)^2 + 30.45 \cdot \frac{b}{a+b} - 6.3 \quad (2)$$

As is apparent from Formulas (1) and (2), a dimensioning rule suited for eliminating the inertial forces is dependent neither on masses of individual transducer components, particularly on those of flow tube 10 or support body 20, nor on other parameters, such as spring constants or natural frequencies. Accordingly, the transducer can, for example, be made very light, because virtually no inert masses are necessary to provide vibration isolation between the transducer and the connected pipe. It is also apparent that both Formulas (1) and (2) are dependent on several parameters and thus underdetermined, which, in turn, opens up a multitude of optimized, i.e., dynamically well balanced, variants for dimensioning the transducer.

As a result of the superposition of the vibrations of flow tube 10 according to the first and second natural modes, which act simultaneously when fluid flow is present in the tube, the latter is deformed slightly asymmetrically with respect to the axis of symmetry $A_1$ and thus performs relatively weak oscillating motions in tube plane $E_1$. The resulting moments and inertial forces acting along tube axis $A_2$ are very small and, because of the rigid, mechanically low- and medium-frequency-filtering coupling to the pipe, can be readily kept away from the latter. If necessary, suitable vibration absorbers may additionally be mounted on the transducer, for example on support body 20.

To generate mechanical vibrations of flow tube 10, the transducer further comprises an excitation system 30, particularly an electrodynamic shaker. The excitation system serves to convert electric excitation energy $E_{exc}$, preferably supplied from control electronics (not shown) of the Coriolis mass flowmeter, for example with a regulated current and/or a regulated voltage, into an excitation force $F_{exc}$ acting on flow tube 10, for example in a pulsed manner or harmonically, and elastically deforming tube in the manner described above. The excitation force $F^{exc}$, as shown schematically in FIG. 4, may be bidirectional or unidirectional and be adjusted in amplitude, for example with a current and/or voltage regulator, and in frequency, for example with a phase-locked loop, in the manner familiar to those skilled in the art.

In a further preferred embodiment of the invention, excitation system 30 is also fixed to support body 20, for example via a stiff fixing sheet 20A, and, as shown schematically in FIG. 1, is implemented with a magnet coil wound around a core, which coil, traversed by a coil current, produces the excitation force $F_{exc}$ between the core and a magnet rigidly attached to flow tube 10 and separated from the core by an air gap. Core and armature are so arranged and aligned relative to each other that the generated excitation force $F_{exc}$ acts on flow tube 10 in alignment with the axis of symmetry $A_1$ see FIG. 4. Particularly for excitation in the f3 natural mode, excitation system 30 may also be so disposed with respect to flow tube 10 that the excitation force $F_{exc}$, acting in tube plane $E_1$ is directed perpendicular to the axis of symmetry $A_1$ and acts simultaneously precisely at the maxima of the two opposite antinodes, see also U.S. Pat. No. 5,275,061.

Instead of an electrodynamic excitation system, in which mechanical force effects are produced at interfaces in a magnetic circuit, other excitation systems familiar to those skilled in the art, such as those which convert voltages into a mechanical force effect using piezoelectric ceramics, can be used to generate the mechanical vibrations of flow tube 10.

To detect vibrations of flow tube 10, a sensor arrangement as is commonly used for Coriolis mass flowmeters can be employed, for example. In such an arrangement, as shown schematically in FIG. 1, the motions of flow tube 10 in tube plane $E_1$ are sensed with an inlet-side first sensor 40A and an outlet-side second sensor 40B, which convert them into a corresponding first sensor signal $S_1$ and a corresponding second sensor signal $S_2$, respectively. Sensors 40A, 40B, as shown schematically in FIG. 1, may, for instance, be electrodynamic velocity sensors, which perform relative vibration measurements, or electrodynamic displacement sensors, or acceleration sensors. In place of electrodynamic sensor arrangements, sensor arrangements using resistive or piezoelectric strain gages or optoelectronic sensor arrangements may be employed.

What is claimed is:

1. A transducer of the vibration type serving to measure a fluid flow in a pipe, said transducer comprising:
   a flow tube for conducting the fluid, said flow tube defining an inlet-side end and an outlet-side end and being curved symmetrically with respect to an axis of symmetry lying in a flow tube plane;
   a rigid support body fixed to said inlet-side end of said flow tube and said outlet-side end of said flow tube, said flow tube being curved in said flow tube plane trapezoidally with said rigid support body; and
   an excitation system which in operation causes said flow tube to vibrate in an eigenmode, said eigenmode lying within said tube plane and said eigenmode being symmetrical to said axis of symmetry.

2. The transducer as defined in claim 1, wherein said excitation system generates an excitation force which deforms said flow tube and acts in the direction of the axis of symmetry.

3. The transducer as defined in claim 1, wherein said eigenmode of said flow tube has at least three antinodes.

4. The transducer as defined in claim 3, wherein said flow tube performs vibrations in an f3 natural mode.

5. A Coriolis mass flowmeter comprising the transducer as defined in claim 1.

6. A transducer of the vibration type serving to measure a fluid flow in a pipe, said transducer comprising:
   a flow tube for conducting the fluid, said flow tube defining an inlet-side end and an outlet-side end and being curved symmetrically with respect to an axis of symmetry lying in a flow tube plane, and said flow tube having an eigenmode of vibrations lying within said flow tube plane and being symmetrical to said axis of symmetry;
   a rigid support body fixed to said inlet-side end of said flow tube and said outlet-side end of said flow tube, said flow tube being curved in said flow tube plane trapezoidally with said rigid support body; and
   an excitation system which in operation excites said flow tube to vibrate within said eigenmode.

7. The transducer as defined in claim 6, wherein said excitation system generates an excitation force which deforms said flow tube and acts in the direction of the axis of symmetry.

8. The transducer as defined in claim 6, wherein the first eigenmode of said flow tube has at least three antinodes.

9. The transducer as defined in claim 8, wherein said flow tube performs vibrations in an f3 natural mode.

10. A Coriolis mass flowmeter comprising the transducer as defined in claim 6.

11. A transducer of the vibration type, said transducer being connected to a pipe and said transducer comprising:
    a flow tube for conducting a fluid flowing through the pipe, said flow tube defining an inlet-side end and an outlet-side end and being curved symmetrically with respect to an axis of symmetry lying in a flow tube plane, and said flow tube having an eigenmode of vibrations lying within said tube plane and being symmetrical to said axis of symmetry;

a rigid support body fixed to said inlet-side end of said flow tube and said outlet-side end of said flow tube, said flow tube being curved in said flow tube plane trapezoidally with said rigid support body; and an excitation system which in operation excites said flow tube to vibrate within said eigenmode, wherein vibrations of said flow tube inducing Coriolis forces within said fluid flowing through said flow tube, said Coriolis forces causing said flow tube to deform within said flow tube plane antisymmetrically.

12. The transducer as defined in claim 11, wherein said excitation system generates an excitation force which deforms said flow tube and acts in the direction of the axis of symmetry.

13. The transducer as defined in claim 11, wherein the first eigenmode of said flow tube has at least three antinodes.

14. The transducer as defined in claim 13, wherein said flow tube performs vibrations in an f3 natural mode.

15. A Coriolis mass flowmeter comprising the transducer as defined in claim 11.

16. A transducer of the vibration type serving to measure a fluid flow in a pipe, said transducer comprising:

a flow tube for conducting the fluid, said flow tube defining an inlet-side end and an outlet-side end and being curved symmetrically with respect to an axis of symmetry lying in a flow tube plane;

a rigid support body fixed to said inlet-side end of said flow tube and said outlet-side end of said flow tube; and an excitation system which in operation causes said flow tube to vibrate in an eigenmode, said eigenmode lying within said flow tube plane, said eigenmode being symmetrical to said axis of symmetry, and said eigenmode of said flow tube having at least three antinodes.

17. The transducer as claimed in claim 16, wherein said excitation system generates an excitation force which deforms said flow tube and acts in the direction of said axis of symmetry.

18. A Coriolis mass flowmeter comprising the transducer as claimed in claim 16.

19. A transducer of the vibration type serving to measure a fluid flow in a pipe, said transducer comprising:

a flow tube for conducting the fluid, said flow tube being curved symmetrically with respect to an axis of symmetry lying in a tube plane, said flow tube defining an inlet-side end and an outlet-side end, having an eigenmode of vibrations lying within said tube plane and being symmetrical to said axis of symmetry, said eigenmode of said flow tube having at least three antinodes;

a rigid support body fixed to said inlet-side end of said flow tube and said outlet-side end of said flow tube; and an excitation system which in operation excites said flow tube to vibrate substantially at a resonant frequency of said eigenmode of said flow tube.

20. The transducer as claimed in claim 19, wherein:

said excitation system generates an excitation force which deforms said flow tube and acts in the direction of said axis of symmetry.

21. A Coriolis mass flowmeter comprising the transducer as claimed in claim 19.

22. A transducer of the vibration type, said transducer being connected to a pipe and said transducer comprising:

a flow tube conducting a fluid flowing through the pipe, said flow tube defining an inlet-side end and an outlet-side end and being curved symmetrically with respect to an axis of symmetry lying in a flow tube plane, and said flow tube having an eigenmode of vibrations lying within said flow tube plane and being symmetrical to said axis of symmetry, said eigenmode of said flow tube having at least three antinodes;

a rigid support body fixed to said inlet-side end of said flow tube and said outlet-side end of said flow tube; and an excitation system which in operations excites said flow tube to vibrate substantially at a resonant frequency of said eigenmode of said flow tube, wherein:

vibrations of said flow tube inducing Coriolis forces within the fluid flowing through said flow tube, said Coriolis forces causing said flow tube to deform within said tube plane antisymmetrically.

23. The transducer as claimed in claim 22, wherein:

said excitation system generates an excitation force which deforms said flow tube and acts in the direction of said axis of symmetry.

24. A Coriolis mass flowmeter comprising the transducer as claimed in claim 22.

25. A transducer of the vibration type serving to measure a fluid flow in a pipe, said transducer comprising:

a flow tube for conducting the fluid, said flow tube defining an inlet-side end and an outlet-side end and being curved symmetrically with respect to an axis of symmetry lying in a flow tube plane;

a rigid support body fixed to said inlet-side end of said flow tube and said outlet-side end of said flow tube; and an excitation system which in operation excites said flow tube to vibrate substantially at a resonant frequency of an eigenmode of said flow tube, said eigenmode lying within said flow tube plane and said eigenmode being symmetrical to said axis of symmetry, wherein:

said vibrating flow tube generates an inertia force acting in a direction of said axis of symmetry, said inertia force including a first inertia force component and a second inertia force component, said second inertia force component acts in opposition to said first inertia force component.

26. The transducer as claimed in claim 25, wherein:

said excitation system generates an excitation force which deforms said flow tube and acts in the direction of said axis of symmetry.

27. The transducer as claimed in claim 25, wherein:

said eigenmode of said flow tube has at least three antinodes.

28. The transducer as claimed in claim 25, wherein:

said flow tube performs vibrations in an f3 natural mode.

29. A Coriolis mass flowmeter comprising the transducer as claimed in claim 25.

30. A transducer of the vibration type serving to measure a fluid flow in a pipe, said transducer comprising:

a flow tube for conducting the fluid, said flow tube defining an inlet-side end and an outlet-side end and being curved symmetrically with respect to an axis of symmetry lying in a flow tube plane and, said flow tube having an eigenmode of vibrations lying within said tube plane and being symmetrical to said axis of symmetry;

a rigid support body fixed to said inlet-side end of said flow tube and said outlet-side end of said flow tube; and an excitation system which in operation excites said flow tube to vibrate substantially at a resonance frequency of said eigenmode of said flow tube, wherein:

said vibrating flow tube generates an inertial force acting in a direction of said axis of symmetry, said inertial force including a first inertial force component and a second inertial force component, said second inertial force component acts in opposition to said first inertial force component.

31. The transducer as claimed in claim 30, wherein:

said excitation system generates an excitation force which deforms said flow tube and acts in the direction of the axis of symmetry.

32. The transducer as claimed in claim 30, wherein:

said eigenmode of said flow tube has at least three antinodes.

33. The transducer as claimed in claim 30, wherein:

said flow tube performs vibrations in an f3 natural mode.

34. A Coriolis mass flowmeter comprising the transducer as claimed in claim 30.

35. A transducer of the vibration type, said transducer being connected to a pipe and said transducer comprising:
- a flow tube conducting a fluid flowing through the pipe, said flow tube defining an inlet-side end and an outlet-side end and being curved symmetrically with respect to an axis of symmetry lying in a flow tube plane and said flow tube having an eigenmode of vibrations lying within said tube plane and being symmetrical to said axis of symmetry;
- a rigid support body fixed to said inlet-side end of said flow tube and said outlet-side end of said flow tube; and
- an excitation system which in operation excites said flow tube to vibrate substantially at a resonance frequency of said eigenmode of said flow tube, wherein:

said vibrating flow tube generates an inertial force acting in a direction of said axis of symmetry, said inertial force including a first inertial force component and a second inertial force component, said second inertial force component acts in opposition to said first inertial force component; and vibrations of said flow tube inducing Coriolis forces within said fluid flowing through said flow tube, said Coriolis forces causing said flow tube to deform within said tube plane antisymmetrically.

36. The transducer as claimed in claim 35, wherein:

said excitation system generates an excitation force which deforms said flow tube and acts in the direction of the axis of symmetry.

37. The transducer as claimed in claim 35, wherein:

said eigenmode of said flow tube has at least three antinodes.

38. The transducer as claimed in claim 35, wherein:

said flow tube performs vibrations in an f3 natural mode.

39. A Coriolis mass flowmeter comprising the transducer as claimed in claim 35.

* * * * *